J. P. NISSEN.
MECHANICAL SCREW DRIVER AND DRILLING MACHINE.
APPLICATION FILED SEPT. 23, 1912.
1,102,947.
Patented July 7, 1914.
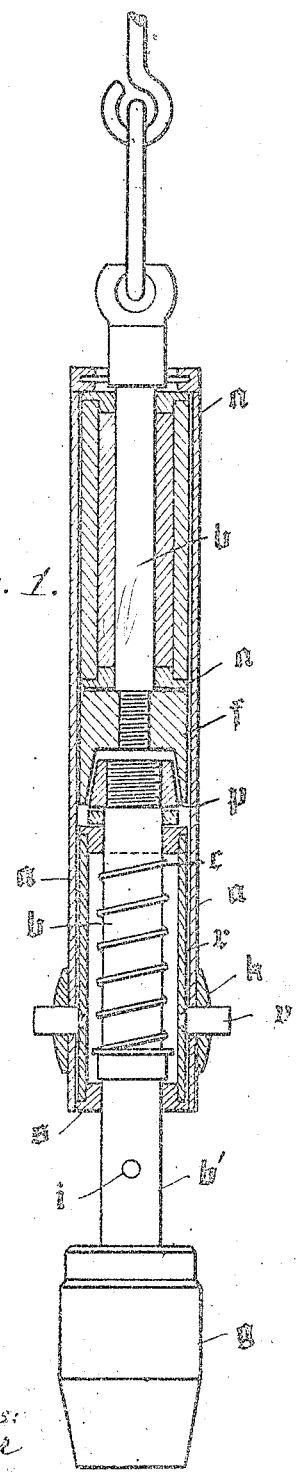
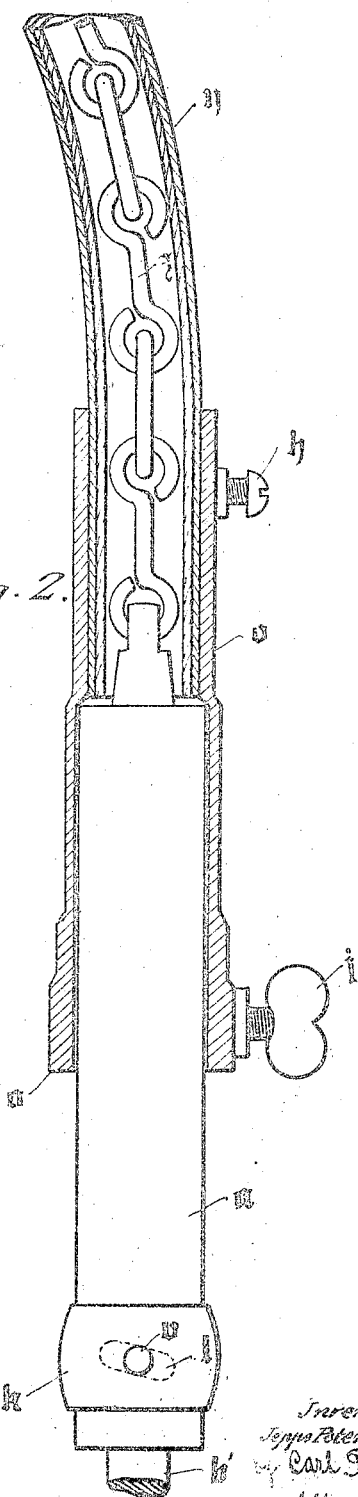

UNITED STATES PATENT OFFICE.

JEPPE PETER NISSEN, OF ODENSE, DENMARK.

MECHANICAL SCREW-DRIVER AND DRILLING-MACHINE.

1,102,947.    Specification of Letters Patent.    Patented July 7, 1914.

Application filed September 23, 1912. Serial No. 721,895.

*To all whom it may concern:*

Be it known that I, JEPPE PETER NISSEN, a subject of the King of Denmark, and resident of Odense, Denmark, have invented a Mechanical Screw-Driver and Drilling-Machine, of which the following is a specification.

This invention relates to a mechanical screw driver and drilling machine.

In the accompanying drawing:—Figure 1 shows the apparatus partly in elevation and partly in section; Fig. 2 shows a side elevation of the lower part of the apparatus.

In carrying out my invention I provide a metal casing $a$ the ends of which are closed by brass bushes $s$. The latter are adapted to receive and guide a rotatable axle consisting of two parts, namely an upper part $b$ and a lower part $b'$ which are made to connect by a friction coupling $f$, so that the said lower part of the axle, to which the coupling piece $p$ is fastened, can be coupled or uncoupled, when working from the permanently revolving upper part $b$.

$r$ is a movable piece of tubing, inserted in the metal casing $a$, into which the bolts $v$ are screwed. These bolts are passed through two oblique slots $e$ in the metal casing $a$ as well as through two corresponding holes in a ring $k$ mounted on the said casing. By turning the ring $k$, the friction coupling can thus be put into gear and out of gear.

Power can be transmitted to the apparatus by means of an electro-motor or a rotating axle, and a chain $z$ which is connected to the part $b$ at $y$.

$g$ is a common screw-mandrel, for fastening screw-drivers, drills, etcetera. When adjusting drills or screw-drivers to the mandrel, the axle may be kept out of action by inserting a pin in the hole $i$ provided near the lower end of the part $b'$.

This mechanism is particularly applicable when the apparatus is used for borings, whereby it is essential that the drill constantly revolves.

Having now fully described my said invention what I claim and desire to secure by Letters Patent is:—

In a mechanical screw driving and drilling machine, the combination with a metal casing having oppositely disposed and oblique slots near its lower end, of metal bushes fixed at and closing each end of said casing, an axle consisting of two parts mounted in and guided by the bushes, a friction coupling adapted to connect the said two parts, a tube arranged within the lower portion of the casing and adapted to move therein, two oppositely disposed bolts screwed into the said tube and projecting through the oblique slots in the casing, a ring having holes and mounted on the casing, the said holes snugly embracing the bolts, and means to transmit motion to the apparatus, all substantially as and for the purpose set forth.

In testimony whereof I have hereunto set my hand in the presence of two subscribing witnesses,

JEPPE PETER NISSEN.

Witnesses:
CARL ANTON ANDREASEN,
HANS WILHELM LARSEN.